(12) United States Patent
Liu et al.

(10) Patent No.: US 12,595,728 B2
(45) Date of Patent: Apr. 7, 2026

(54) PACK OFF INDICATOR FOR A WELLBORE OPERATION

(71) Applicant: Landmark Graphics Corporation,
Houston, TX (US)

(72) Inventors: Zhengchun Michael Liu, Sugar Land,
TX (US); Robello Samuel, Cypress,
TX (US)

(73) Assignee: Landmark Graphics Corporation,
Houston, TX (US)

( * ) Notice: Subject to any disclaimer, the term of this
patent is extended or adjusted under 35
U.S.C. 154(b) by 0 days.

(21) Appl. No.: 19/261,569

(22) Filed: Jul. 7, 2025

(65) Prior Publication Data

US 2025/0334040 A1      Oct. 30, 2025

Related U.S. Application Data

(63) Continuation of application No. 17/952,785, filed on
Sep. 26, 2022, now Pat. No. 12,378,871.

(51) Int. Cl.
E21B 21/08       (2006.01)
E21B 47/003       (2012.01)
G01V 20/00       (2024.01)

(52) U.S. Cl.
CPC ............ E21B 47/003 (2020.05); G01V 20/00
(2024.01); E21B 2200/20 (2020.05)

(58) Field of Classification Search
CPC ........ E21B 49/005; E21B 21/08; E21B 44/00;
E21B 47/10; E21B 49/003; E21B 47/002;
(Continued)

(56) References Cited

U.S. PATENT DOCUMENTS

| | | | |
|---|---|---|---|
| 5,327,984 A | 7/1994 | Rasi et al. | |
| 8,775,086 B2 | 7/2014 | Frunza | |

(Continued)

FOREIGN PATENT DOCUMENTS

| | | | |
|---|---|---|---|
| CN | 113868951 A | 12/2021 | |

OTHER PUBLICATIONS

Escobar et al., "New Approach For Estimating Cavings Volume To
Avoid Wellbore Instabilities", Rock Mechanics for Natural Resources
and Infrastructure, Sep. 9-13, 2014, 7 pages.
(Continued)

*Primary Examiner* — Kipp C Wallace
(74) *Attorney, Agent, or Firm* — Kilpatrick Townsend &
Stockton LLP

(57)      ABSTRACT

A system can determine, based on an accumulation of
geological material in a wellbore, a pack off indicator
indicating a likelihood of a downhole tool being immobile in
the wellbore. The accumulation of geological material in the
wellbore comprises cuttings resulting from an action of the
downhole tool positioned in the wellbore and settled cavings
resulting from instability in the wellbore. Determining the
pack off indicator can include estimating the accumulation
of geological material in the wellbore. Determining the pack
off indicator additionally can include dividing the estimated
accumulation by a volume of a wellbore annulus defined by
a first set of wellbore piping and a second set of wellbore
piping positioned in the wellbore. The system can automati-
cally adjust a wellbore operation using the pack off indicator
by controlling a flow of circulating fluid in response to the
pack off indicator exceeding a predetermined threshold.

20 Claims, 7 Drawing Sheets

(58) Field of Classification Search

CPC ... E21B 47/0025; E21B 47/003; G01V 20/00; G01V 1/40

See application file for complete search history.

(56) References Cited

U.S. PATENT DOCUMENTS

| | | | |
|---|---|---|---|
| 9,228,430 | B2 | 1/2016 | Rasmus et al. |
| 10,400,570 | B2 | 9/2019 | Erge et al. |
| 10,428,647 | B1 * | 10/2019 | Bermudez Martinez .................... G01V 11/002 |
| 10,590,761 | B1 | 3/2020 | Bermudez Martinez |
| 11,011,043 | B2 | 5/2021 | Nazhan |
| 11,680,477 | B1 | 6/2023 | Guo et al. |
| 11,920,455 | B1 * | 3/2024 | Zhang ..................... E21B 47/09 |
| 2009/0294174 | A1 | 12/2009 | Harmer et al. |
| 2011/0153296 | A1 | 6/2011 | Sadlier et al. |
| 2013/0054146 | A1 | 2/2013 | Rasmus et al. |
| 2013/0090854 | A1 | 4/2013 | Rasmus et al. |
| 2013/0090855 | A1 * | 4/2013 | Rasmus .................. E21B 21/08 702/9 |
| 2013/0153296 | A1 | 6/2013 | Aphale et al. |
| 2014/0246238 | A1 | 9/2014 | Abbassian et al. |
| 2015/0226049 | A1 | 8/2015 | Frangos et al. |
| 2018/0051552 | A1 | 2/2018 | Li et al. |
| 2020/0332654 | A1 | 10/2020 | Rowe et al. |
| 2020/0362694 | A1 | 11/2020 | Al-Rubaii et al. |
| 2021/0047911 | A1 | 2/2021 | Rowe |
| 2021/0140274 | A1 | 5/2021 | Forshaw et al. |
| 2023/0136646 | A1 | 5/2023 | Alfaraj et al. |
| 2023/0203937 | A1 | 6/2023 | Guo et al. |
| 2023/0384479 | A1 | 11/2023 | Hamid et al. |

OTHER PUBLICATIONS

International Patent Application No. PCT/US2023/021697, International Search Report and Written Opinion mailed Aug. 25, 2023, 9 pages.

Saasen et al., "Automatic Measurement of Drilling Fluid and Drill Cuttings Properties", SPE Drilling & Completion, vol. 24, No. 4, Dec. 2009, pp. 1-17.

Willersrud et al., "Early Pack-Off Diagnosis in Drilling Using an Adaptive Observer and Statistical Change Detection", IFAC-PapersOnLine, vol. 48, No. 6, May 2015, pp. 177-182.

Zhou et al., "On the Mechanical Stability of Inclined Wellbores", SPE Drilling & Completion, Jun. 1996, pp. 67-73.

* cited by examiner

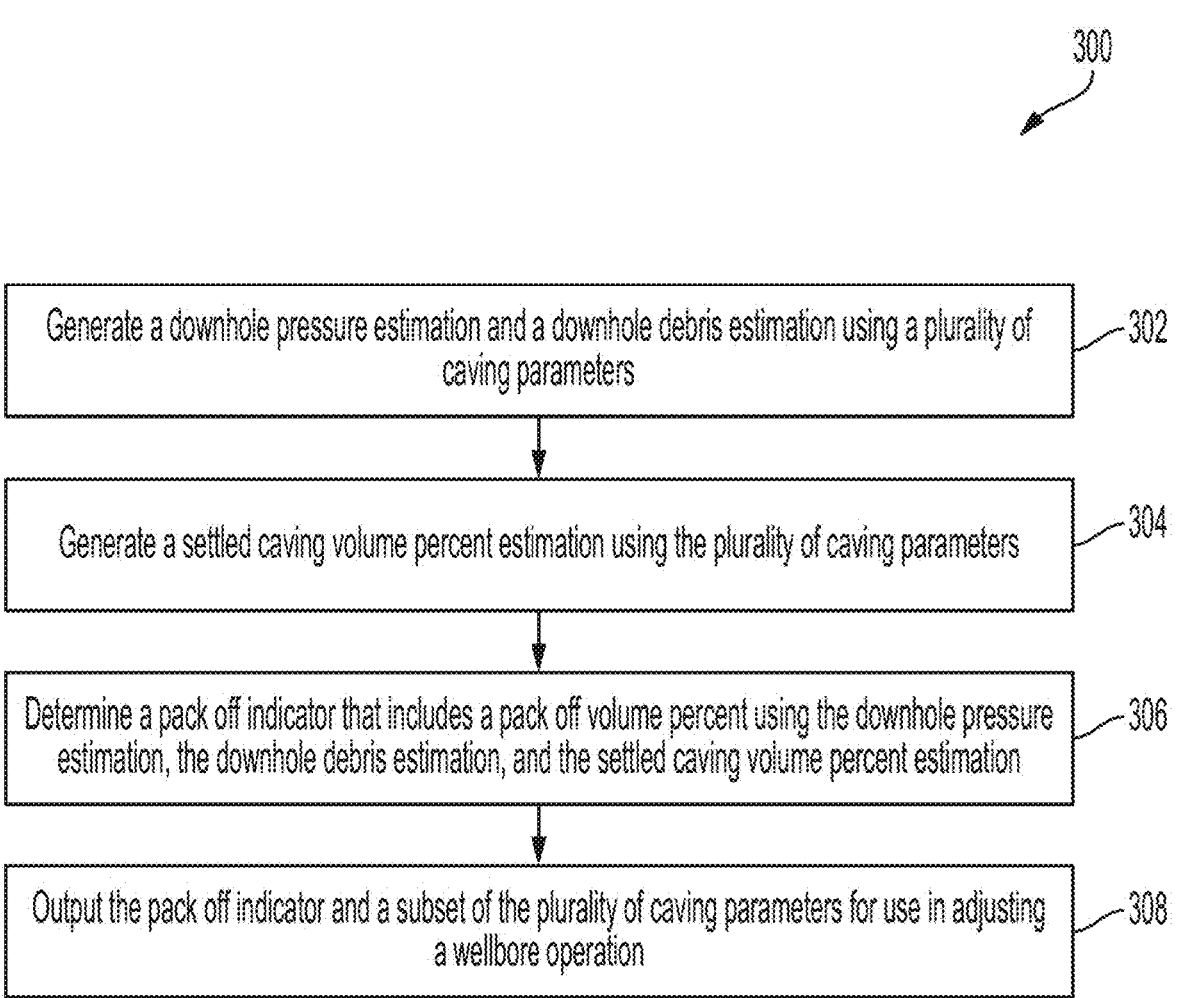

300

Generate a downhole pressure estimation and a downhole debris estimation using a plurality of caving parameters — 302

Generate a settled caving volume percent estimation using the plurality of caving parameters — 304

Determine a pack off indicator that includes a pack off volume percent using the downhole pressure estimation, the downhole debris estimation, and the settled caving volume percent estimation — 306

Output the pack off indicator and a subset of the plurality of caving parameters for use in adjusting a wellbore operation — 308

Determine a caving size estimation using a caving depth estimation that is determined using a plurality of downhole wellbore measurements ~402

Determine a caving volume estimation using the caving depth estimation and model calibration ~404

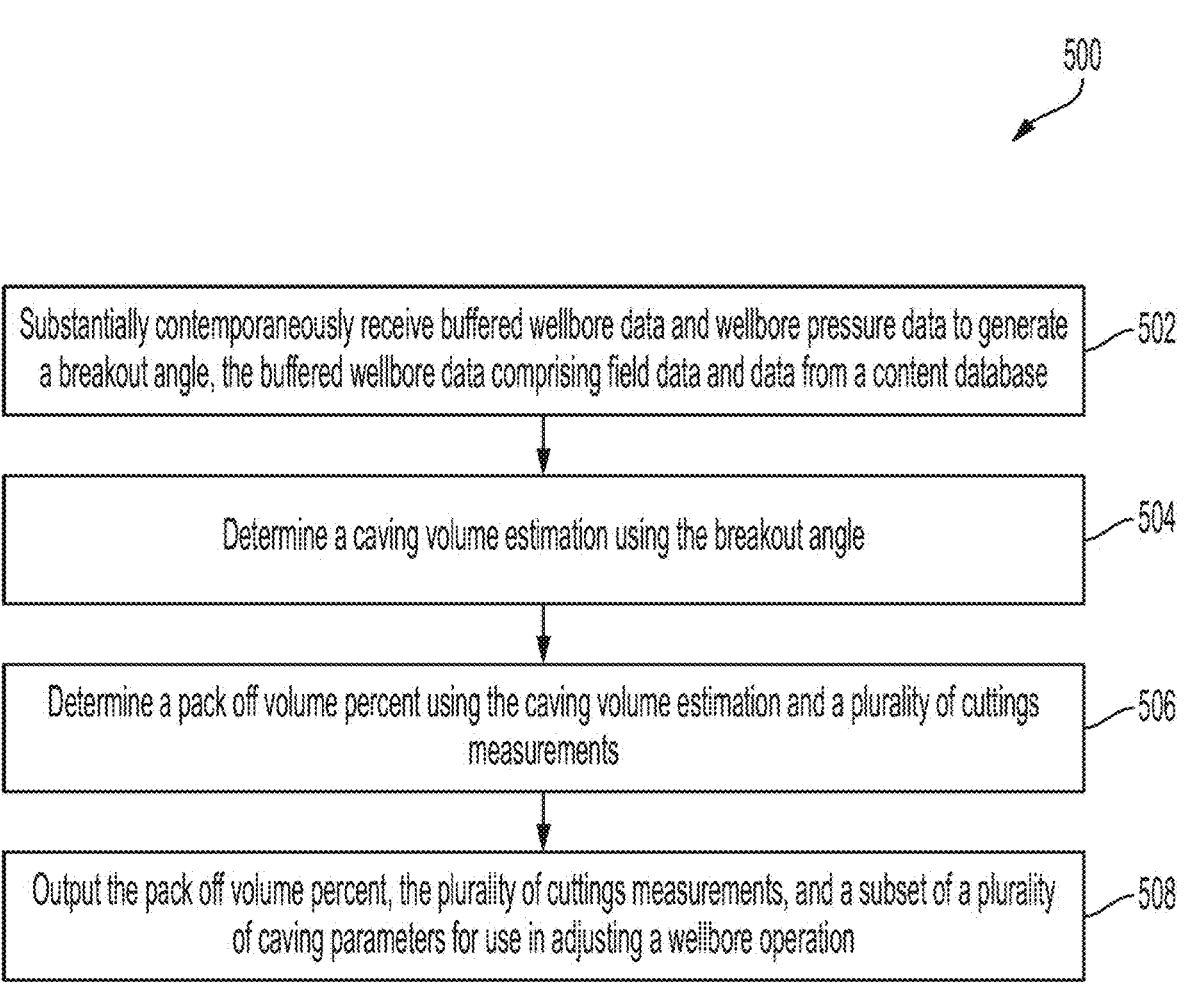

500

Substantially contemporaneously receive buffered wellbore data and wellbore pressure data to generate a breakout angle, the buffered wellbore data comprising field data and data from a content database — 502

Determine a caving volume estimation using the breakout angle — 504

Determine a pack off volume percent using the caving volume estimation and a plurality of cuttings measurements — 506

Output the pack off volume percent, the plurality of cuttings measurements, and a subset of a plurality of caving parameters for use in adjusting a wellbore operation — 508

FIG. 5

PACK OFF INDICATOR FOR A WELLBORE OPERATION

CROSS-REFERENCE TO RELATED APPLICATION

This is a continuation of U.S. patent application Ser. No. 17/952,785, titled "Pack Off Indicator for a Wellbore Operation," and filed Sep. 26, 2022, the entirety of which is incorporated herein by reference.

TECHNICAL FIELD

The present disclosure relates generally to wellbore operations and, more particularly (although not necessarily exclusively), to a pack off indicator for a wellbore operation.

BACKGROUND

A wellbore can be formed in a subterranean formation for extracting produced hydrocarbon or other suitable material. A wellbore operation can be performed to extract the produced hydrocarbon material or perform other suitable tasks relating to the wellbore. During the wellbore operation, a downhole tool can be deployed into the subterranean formation to form the wellbore or adjust dimensions of the wellbore. Geological debris from drilling in the wellbore can include drill cuttings that can accumulate downhole. A downhole accumulation of drill cuttings can cause problems with moving or accessing the drilling tool, which can lead to costly delays in the wellbore operation.

BRIEF DESCRIPTION OF THE DRAWINGS

FIG. 3 is a flowchart of a process for determining a pack off indicator that includes a pack off volume percent for a wellbore operation according to one example of the present disclosure.

FIG. 5 is a flowchart of a process for substantially contemporaneously determining a pack off indicator that includes a pack off volume percent for a wellbore operation according to one example of the present disclosure.

DETAILED DESCRIPTION

Figure 1:
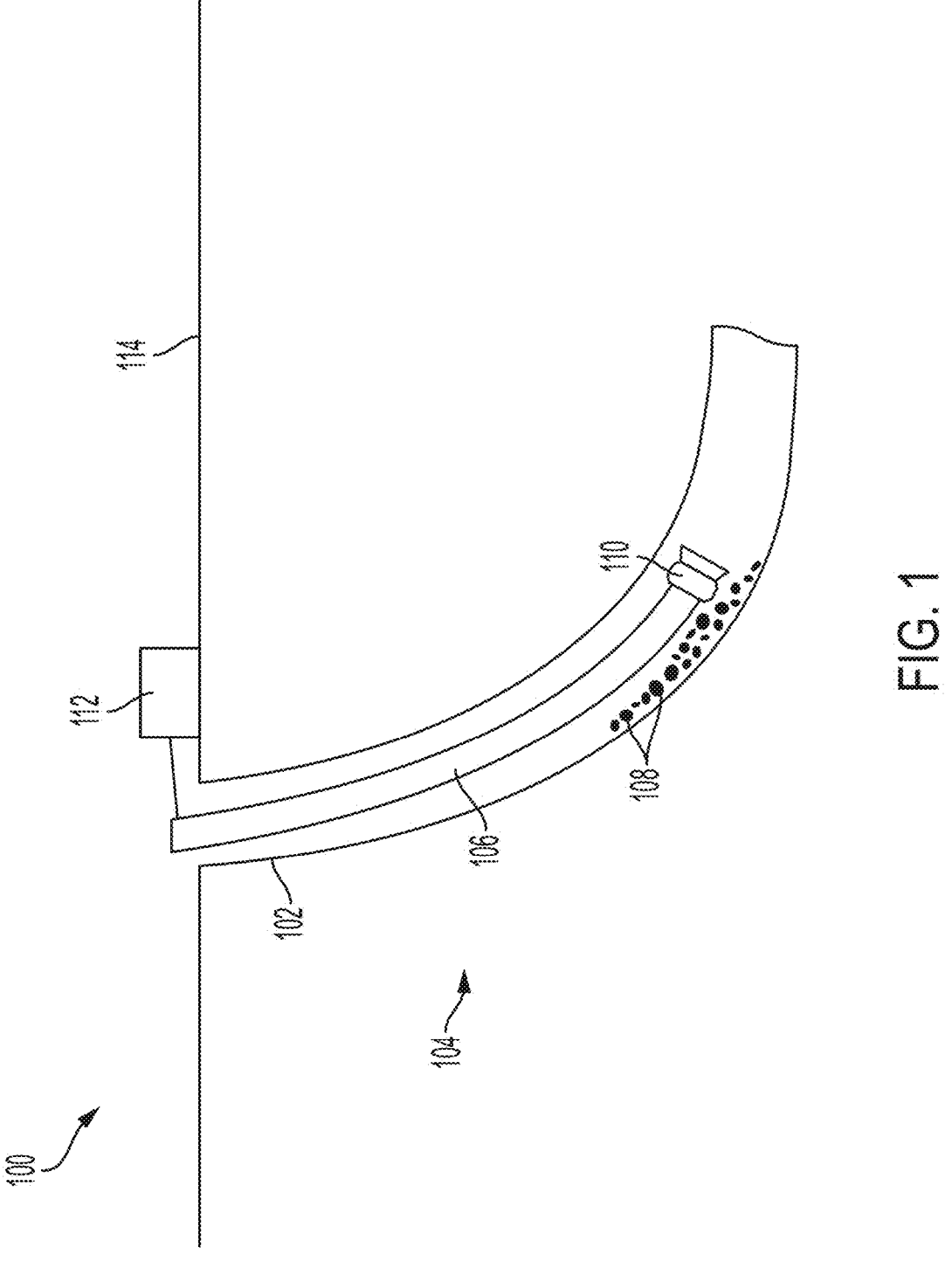
FIG. 1 is a schematic of a well system with a downhole tool according to one example of the present disclosure.

Certain aspects and examples of the present disclosure relate to determining a pack off indicator that includes a pack off volume percent with respect to a wellbore operation. Pack off can include or be caused by material that blocks a circulating flow in the wellbore operation. The material that blocks the circulating flow can include an accumulation of downhole debris, which can cause downhole equipment, such as a downhole tool, in the wellbore operation to be immobile or inaccessible. Examples of the downhole debris can include settled caving debris, cutting debris, a combination thereof, or the like. A pack off indicator can include a wellbore parameter that can quantify a likelihood of the pack off occurring during the wellbore operation. The pack off volume percent can be a type of the pack off indicator and can account for settled caving volume and cutting bed volume. The pack off volume percent can be determined using software models, which can include an engineering model, that are used to generate downhole pressure estimations, downhole debris estimations, settled caving volume percent estimations, and the like. The engineering model can receive caving parameters, such as at least one caving volume estimation and at least one caving size estimation, as inputs to generate suitable downhole estimations to determine the pack off volume percent. A computing device can output the pack off volume percent and a subset of the caving parameters via a user interface. The user interface can provide the pack off volume percent and the subset of the caving parameters for use in adjusting the wellbore operation.

The software models can reduce an amount of additional equipment in the wellbore to determine pack off indicators, thereby decreasing resources used for the wellbore operation. Examples of the additional equipment can include additional pressure sensors in a wellbore annulus, wired drill piping, or other suitable additional wellbore equipment. The wellbore annulus can be a downhole area defined by the wellbore that is between a first set of wellbore piping and a second set of wellbore piping. The pack off volume percent can be determined using a sum of downhole debris estimations divided by an annulus volume. The downhole debris estimations can include estimations for the cutting bed volume and estimations for the settled caving volume. The engineering model can generate the downhole debris estimations and downhole pressure estimations from the at least one caving volume estimation and the at least one caving size estimation. The software models can include a geomechanical model that can determine the at least one caving volume estimation using caving depth estimations and caving model calibration. Additionally, the software models can include a data-driven model that can determine the caving depth estimations and the at least one caving size estimation. The data-driven model can be trained using log data obtained from one or more logging tools, such as logging-while-drilling tools.

The data-driven model can determine caving depth estimations using log data, rock properties, downhole pressure data, geological stress data, or other suitable geomechanics parameters. Alternatively, the data-driven model can determine caving depth estimations using a breakout angle, wellbore survey data, operation parameters, formation properties, or other suitable wellbore data. For example, the data-driven model can estimate the caving depth as half of a difference between a caliper log reading and a bit size. The bit size can include a diameter of a drilling bit. The caving depth can be assumed as a function of uniaxial compressive strength, maximum horizontal stress, minimum horizontal stress, vertical stress, pore pressure, wellbore pressure, gamma ray log data, Poisson's ratio of rock, and the like. Additionally, caliper log data from one or more wellbores can be used to train one or more data-driven models.

A correlation, presented below as in Equation 1, can be used to determine the caving depth estimations.

$$\frac{h}{R} = f_{rock} * W_{bo} * W_{bo} \tag{Equation 1}$$

R can represent a wellbore radius and can be determined by halving the bit size. The lefthand side of Equation 1 can represent a normalized caving depth using a ratio of h, the caving depth estimation, and R, the wellbore radius. $f_{rock}$ can represent a formation factor, which can be empirically determined for each formation layer in the wellbore using offset well caliper data. For example, $f_{rock}$ can equal $2.55 \times 10^{-6}$, which can be determined using regression on field data.

Assuming a predetermined geometry for the caving debris, the at least one caving volume estimation can be determined by:

$$\text{Caving volume} = R * W_{bo} * h * L \tag{Equation 2}$$

in which R can represent the wellbore radius, and h can represent the caving depth estimation. L can represent the caving length, and $W_{bo}$ can represent the breakout angle. The predetermined geometry can include a triangular prism, a rectangular prism, or the like. Additionally or alternatively, the at least one caving volume estimation can be determined using a software simulation that uses geomechanics parameters as inlet parameters. The breakout angle for a vertical wellbore can be estimated using Equation 3 and Equation 4, below.

$$W_{bo} = \pi - 2\theta_b \tag{Equation 3}$$

$$2\theta_b = \cos^{-1}\left(\frac{UCS + P_w + P_P - \sigma_h - \sigma_H}{2\sigma_h - 2\sigma_H}\right) \tag{Equation 4}$$

The breakout angle for a deviated wellbore can be estimated with a calculation that accounts for wellbore inclination and wellbore azimuth.

The at least one caving size estimation can be determined using a size ratio between caving size and cutting size. While the caving size can averagely be larger than the cutting size, size distributions of the caving size can be similar to size distributions of the cutting size. A similar size reduction can be assumed for the downhole debris occurring from the drill bit fully penetrating shale rock in the wellbore. A ratio of the similar size reduction can include the size ratio, which is similar or identical to a quotient of the caving depth estimation and a product of initial bit cutter size and one-eighth of drill bit dull grade. Accordingly, an average caving size can be similar or identical to a quotient of the product of average cutting size and the caving depth estimation and the product of initial bit cutter size and one-eight of the drill bit dull grade.

Determining the pack off volume percent can additionally or alternatively be performed for substantially contemporaneous (e.g., "real-time") monitoring of the likelihood of the pack off occurring during the wellbore operation. A breakout angle model can determine a breakout angle estimation for the data-driven model to use for determining at least one real-time caving volume estimation. The breakout angle model can use real-time field data, real-time wellbore pressure data, and data from a content database to estimate breakout angle. The real-time field data can include survey data, rig-state data, and other suitable well system data. The real-time wellbore pressure data can be determined by the engineering model using the data from the content database, real-time rig-state data, or a combination thereof. Additionally, the real-time field data can be continuously received by a computing device and can be buffered in caches. The data from the content database can include formation properties, well configuration, pore pressure, fracturing pressure, and other suitable input data. The buffered real-time field data can be included in the well configuration data of the content database.

A pack off simulation can use the at least one real-time caving volume estimation and real-time cuttings data to determine a real-time pack off volume percent. The real-time cuttings data can include real-time cuttings bed height estimations or other suitable data related to cuttings accumulating in the wellbore. Additionally, the real-time cuttings data can be determined by the engineering model using the well configuration data from the content database.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a well system 100 with a downhole tool 110 according to one example of the present disclosure. The well system 100 can include a wellbore 102 formed in a subterranean formation 104 below a well surface 114. The wellbore 102 may be formed during a wellbore operation. In some examples, the wellbore operation can include a drilling operation, a tripping operation, or other suitable operation related to the well system 100.

The downhole tool 110 can be deployed into the wellbore 102 via a drillstring 106, a tubing string, a work string, etc. In examples in which the wellbore operation is a tripping operation, the tripping operation can include removing the drillstring 106 from the wellbore 102 or replacing the drillstring 106 in the wellbore 102. The drillstring 106 can include piping, a bottomhole assembly, the downhole tool 110, or other suitable downhole devices. The piping can connect the bottomhole assembly and the downhole tool 110 to surface equipment located above the well surface 114. The surface equipment can include a computing device 112, which can be used to adjust the wellbore operation. Additionally, the piping can pump drilling fluid to the drill bit or make suitable positional adjustments to the bottomhole assembly and the downhole tool 110. An example of the downhole tool 110 can include a drill bit. The drill bit can rotate in the wellbore 102 to crush or cut geological material in the subterranean formation 104. Additionally, the drill bit may use rotational motions, hammering motions, or other suitable motions to break down the geological material. The tripping operation may be performed when the drill bit has dulled or has become inefficient at drilling the geological material in the wellbore 102.

Downhole debris 108 can result from the downhole tool 110 breaking down the geological material. Cuttings can be downhole debris 108 that result from an action by the downhole tool 110. Additionally or alternatively, the downhole debris 108 can result from instability, such as tectonic stresses or over-pressured geological material, in the wellbore 102. Cavings can be downhole debris 108 that result from instability in the wellbore 102. The downhole debris 108 can include various shapes of rock, such as splinters, shards, or chunks. The downhole debris 108 can accumulate in the wellbore 102. An accumulation of the downhole debris 108 may be referred to as pack off. The pack off can hinder movement of the drillstring 106 and can cause delays in the wellbore operation. Additionally, the pack off can cause the downhole tool 110, the drillstring 106, or the like to be damaged or immobile. For example, the downhole tool 110 can be scraped or otherwise damaged by the downhole debris 108 when attempting to remove the downhole tool 110 from the wellbore 102. Circulating wellbore fluids through the piping can clean the wellbore 102 by removing the downhole debris 108 from the wellbore 102.

The pack off can be represented using a pack off indicator, such as a pack off volume percent. Additional examples for the pack off indicator can include a pack off volume index that can range from a minimum number to a maximum number. For example, the pack off volume index can range from zero to one hundred, inclusive. The pack off volume index being zero can indicate a negligible likelihood of pack off occurring during the wellbore operation, and the pack off volume index being one hundred can indicate a certain likelihood of pack off occurring during the wellbore operation.

Figure 2:
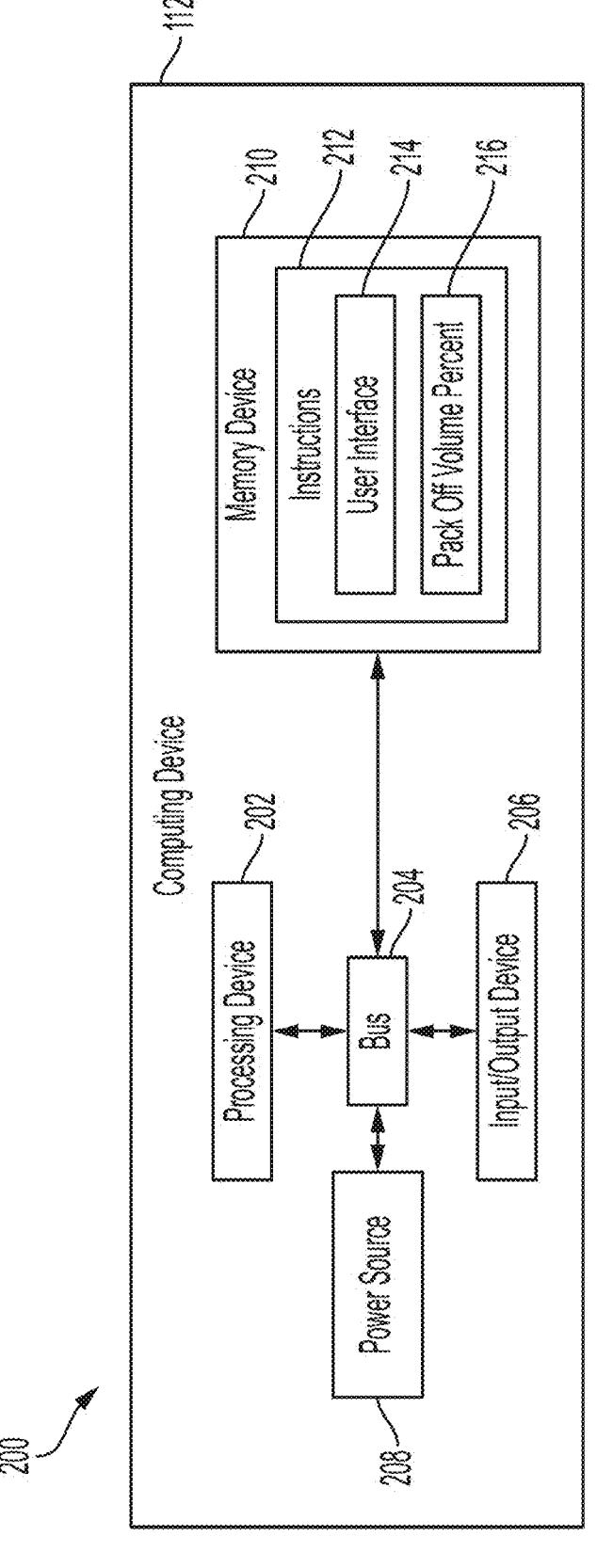
FIG. 2 is a block diagram of a computing system for determining a pack off indicator that includes a pack off volume percent for a wellbore operation according to one example of the present disclosure.

FIG. 2 is a block diagram of a computing system 200 for determining a pack off indicator that includes a pack off volume percent 216 for a wellbore operation according to one example of the present disclosure. The computing system 200 can include the computing device 112. Components shown in FIG. 2 may be integrated into a single structure, such as in a single housing of the computing device 112. Alternatively, the components shown in FIG. 2 may be distributed from other components and in electrical communication with the other components.

The computing device 112 can include a processing device 202, a memory device 210, an input/output device 206, and a power source 208 that are communicatively coupled via a bus 204. The input/output device 206 can include a display device, such as a screen or a monitor. Additionally, the input/output device 206 can include a keyboard or a mouse. A user can view downhole data via the display device and can provide input to the computing device 112 via the input/output device 206. The input can be used by the computing device 112 to adjust the wellbore operation.

The processing device 202 can include one processing device or multiple processing devices. Non-limiting examples of the processing device 202 include a Field-Programmable Gate Array (FPGA), an application-specific integrated circuit (ASIC), a microprocessing device, etc. The processing device 202 can execute instructions 218 stored in the memory device 210 to perform operations. In some examples, the instructions 212 can include processing device-specific instructions generated by a compiler or an interpreter from code written in any suitable computer-programming language, such as C, C++, C #, etc.

The processing device 202 can be communicatively coupled to the memory device 210 via the bus 204. The memory device 210 can include one memory or multiple memories and can be non-volatile and may include any type of memory that retains stored information when powered off. Non-limiting examples of the memory include electrically erasable and programmable read-only memory (EEPROM), flash memory, or any other type of non-volatile memory. At least some of the memory can include a non-transitory computer-readable medium from which the processing device 202 can read instructions 212. The non-transitory computer-readable medium can include electronic, optical, magnetic, or other storage devices capable of providing the processing device 202 with computer-readable instructions 212 or other program code. Examples of the non-transitory computer-readable medium include magnetic disk(s), memory chip(s), ROM, random-access memory (RAM), an ASIC, a configured processing device, optical storage, or any other medium from which a computer processing device can read the instructions 212.

In some examples, the memory device 210 can include instructions 212 for causing the processing device 202 to determine the pack off volume percent 216 or other suitable pack off indicators that can indicate a likelihood of pack off occurring during the wellbore operation. In some examples, the pack off volume percent 216 may range from zero percent to one hundred percent, inclusive. Zero percent for the pack off volume percent 216 can indicate a negligible likelihood of pack off occurring during the wellbore operation, and one hundred percent for the pack off volume percent 216 can indicate a certain likelihood of pack off occurring during the wellbore operation. Additionally, the processing device 202 can output the pack off volume percent 216 to a user interface 214 via the input/output device 206. The user interface 214 can include a plot of the pack off volume percent 216. A user can use the user interface 214 to determine one or more adjustments to the wellbore operation. For example, a relatively high pack off volume percent, such as fifty percent, sixty percent, seventy percent, eighty percent, or more, can be outputted to the user. In response to the relatively high pack off volume percent being outputted, the user can increase a circulation rate for the wellbore operation to increase a removal rate for downhole debris 108. Increasing the removal rate may decrease the pack off volume percent 216.

FIG. 3 is a flowchart of a process 300 for determining a pack off indicator that includes a pack off volume percent 216 for a wellbore operation according to one example of the present disclosure. A computing device 112 can include one or more software models for determining the pack off volume percent 216. The one or more software models can include an engineering model, a data-driven model, a geomechanical model, or other suitable computational model.

At block 302, the computing device 112 generates one or more downhole pressure estimations and one or more downhole debris estimations using caving parameters. The engineering model from the one or more software models can include a microservice system. Additionally, the engineering model can receive one or more data files, such as a proto file, and can generate the one or more downhole pressure estimations or the one or more downhole debris estimations. The one or more downhole pressure estimations can include equivalent circulating density, which accounts for a pressure drop in the wellbore 102. The one or more downhole debris estimations can include cutting bed volume percent estimations and other suitable estimations regarding downhole debris volume. Additionally, the caving parameters can include at least one caving volume estimation and at least one caving size estimation.

At block 304, the computing device 112 generates one or more settled caving volume percent estimations using the caving parameters. The caving parameters can be used to update the one or more data files. The engineering model can receive the one or more updated data files as an input for generating the one or more settled caving volume percent estimations. Additionally, to generate the one or more settled caving volume percent estimations, the engineering model can approximate caving debris as cuttings with a larger average size. The one or more settled caving volume percent estimations can provide information regarding volume in a wellbore annulus that is occupied by cavings. Settled cavings can include solid geological material resulting from instability in the wellbore 102 that remains deposited in the wellbore 102 with circulating wellbore fluids.

At block 306, the computing device 112 determines the pack off volume percent 216 using the one or more downhole pressure estimations, the one or more downhole debris estimations, and the one or more settled caving volume percent estimations. A software model, such as the engineering model, from the one or more software models can receive the one or more downhole pressure estimations, the one or more downhole debris estimations, and the one or more settled caving volume percent estimations as inputs to output the pack off volume percent 216.

At block 308, the computing device 112 outputs the pack off volume percent 216 and a subset of the caving parameters for use in adjusting the wellbore operation. The computing device 112 can output the pack off volume percent 216 and the subset of the caving parameters via a user interface 214. The user interface 214 can include a plot of the pack off volume percent 216, the subset of the caving parameters, or other suitable downhole data. The subset of the caving parameters can include the at least one caving volume estimation, the at least one caving size estimation, or a combination thereof. A user can adjust the wellbore operation or subsequent wellbore operations using information from the user interface 214.

Additionally or alternatively, the pack off indicator, the caving parameters, a combination thereof, or the like can be used for automatically controlling the wellbore operation. For example, the computing device 112 can determine an adjustment to the wellbore operation using the pack off volume percent 216 and automatically control the wellbore operation to perform the adjustment. In examples in which the wellbore operation is a tripping operation, the computing device 112 can determine an adjustment to a flow rate for the circulating wellbore fluids that clean the wellbore. The adjustment can be automatically performed before removing a drillstring 106 from the wellbore 102 or deploying the drillstring 106 into the wellbore 102 to minimize damage to the drillstring 106.

Figure 4:
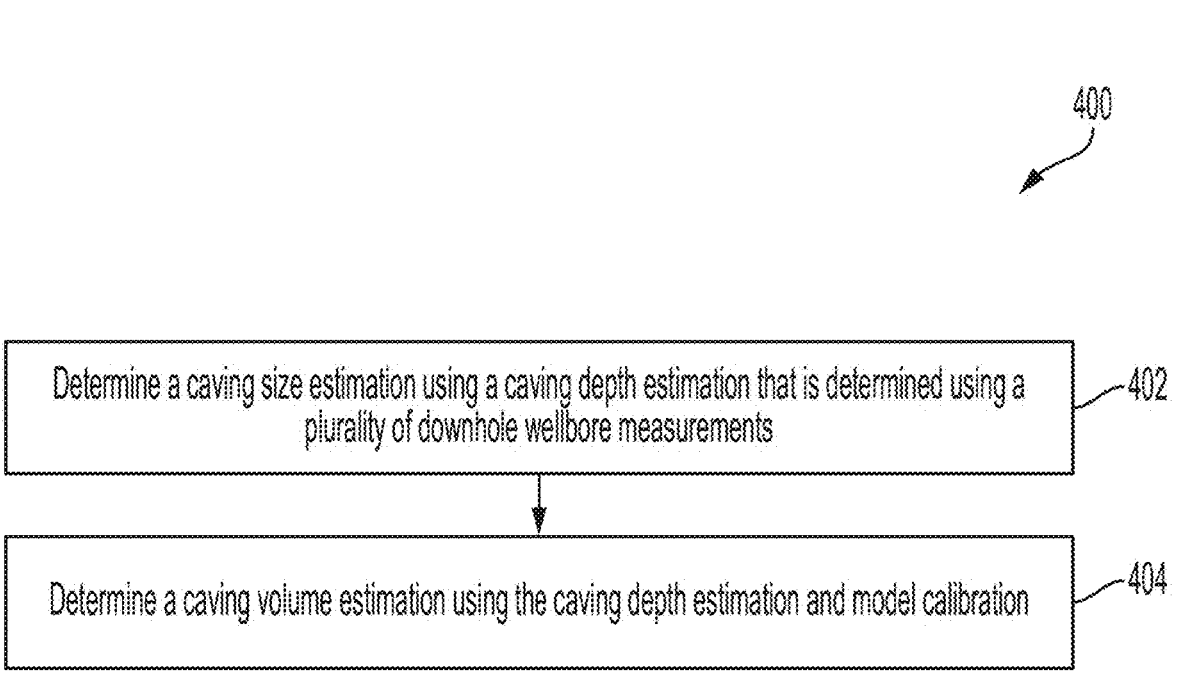
FIG. 4 is a flowchart of a process for determining one or more caving volume parameters and one or more caving size parameters according to one example of the present disclosure.

FIG. 4 is a flowchart of a process 400 for determining one or more caving volume parameters and one or more caving size parameters according to one example of the present disclosure. The computing device 112 can include or execute one or more software models for determining the one or more caving volume parameters and the one or more caving size parameters.

At block 402, the computing device 112 determines one or more caving size estimations using one or more caving depth estimations. The one or more caving depth estimations can be determined using downhole wellbore measurements using a software model, such as a data-driven model, from one or more software models in the computing device 112. The downhole wellbore measurements can be generated via logging tools and can include caliper logging data, gamma ray logging data, sonic logging data, pressure logging data, and other suitable downhole logging data. The gamma ray logging data and the sonic logging data can be used to determine rock properties, such as unconfined compressive strength, Young's modulus, or Poisson's ratio. The pressure logging data can include pore pressure or mud pressure. Additionally, the downhole logging data, such as the pressure logging data, the sonic logging data, the gamma ray logging data, or a combination thereof, can be used to determine geo-stress data of a subterranean formation 104.

The geo-stress data can include vertical stress, maximum horizontal stress, and minimum horizontal stress. The data-driven model can receive the gamma ray logging data, the rock properties, geo-stresses data, caliper logging data, or a combination thereof to generate the one or more caving depth estimations.

At block 404, the computing device 112 determines one or more caving volume estimations associated with caving parameters using one or more caving depth estimations and model calibration. The model calibration can include tuning a software model, such as a geo-mechanical model, to generate more accurate parameters compared to a non-calibrated software model. The model calibration can use caving logging data, one or more caving volume estimations from previous calculations, or a combination thereof to tune the software model. The geo-mechanical model can receive an output from the model calibration and the one or more caving depth estimations from the data-driven model to generate the one or more caving volume estimations.

FIG. 5 is a flowchart of a process 500 for substantially contemporaneously determining a pack off indicator that includes a pack off volume percent 216 with respect to a wellbore operation according to one example of the present disclosure. The computing device 112 can include one or more software models for determining the pack off indicator, such as the pack off volume percent 216 or the like.

At block 502, the computing device 112 substantially contemporaneously receives buffered wellbore data and wellbore pressure data to generate a breakout angle. A software model, such as a breakout angle model, from the one or more software models can generate the breakout angle. The breakout angle can include an angle at which a wellbore breakout occurred. The wellbore breakout may include geological failure adjacent to a wall of the wellbore 102.

The buffered wellbore data can include field data, data from a content database, or other suitable data related to a wellbore 102. The field data can include survey data or rig-state data and can be buffered in caches. Additionally, the field data can be stored in a computing device 112. The data from the content database can include formation properties, well configuration, pressure data, or other suitable downhole data. An engineering model can generate the wellbore pressure data using the well configuration or other suitable wellbore data. The well configuration can be determined using design working pressure, which can include a maximum working pressure at which piping, such as a drillstring 106, in the wellbore 102 is rated for continuous operation.

At block 504, the computing device 112 determines one or more caving volume estimations using the breakout angle. A data-driven model from the one or more software models can receive the breakout angle from the breakout angle model to generate one or more caving depth estimations, the one or more caving volume estimations, or a combination thereof. Alternatively, the breakout angle can be correlated with normalized caving depth to generate the one or more caving depth estimations.

At block 506, the computing device 112 determines the pack off volume percent 216 using the one or more caving volume estimations and cuttings measurements. A simulation model from the one or more software models can receive the one or more caving volume estimations and the cuttings measurements to generate a pack off volume percent 216. The cuttings measurements can indicate a size, such as a diameter, of the cuttings in the wellbore 102. Additionally, the cuttings measurements may be determined by the engineering model using the well configuration.

At block 508, the computing device 112 outputs the pack off volume percent 216, the cuttings measurements, and a subset of caving parameters. The subset of caving parameters can include at least one caving volume estimation or at least one caving size estimation. The computing device 112 can output the pack off volume percent 216, the cuttings measurements, and the subset of the caving parameters via a user interface 214. The user interface 214 can include a plot of the pack off volume percent 216, the cuttings measurements, and the subset of the caving parameters that are presented with respect to a measured depth of the wellbore 102. The measured depth may indicate a length of the wellbore 102 along a well path.

Figure 6:
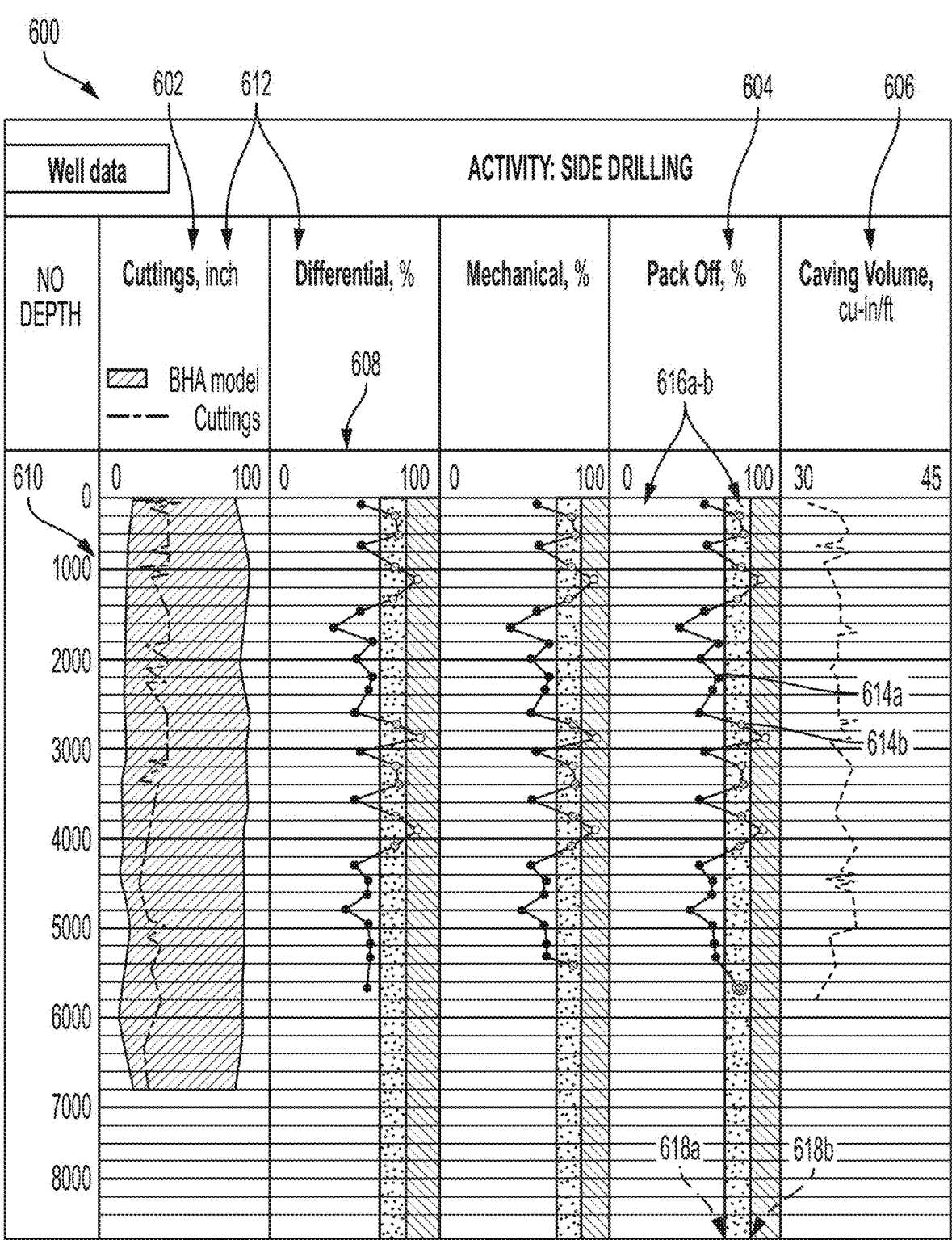
FIG. 6 is an example of a graphical user interface for presenting pack off indicators according to one example of the present disclosure.

FIG. 6 is an example of a graphical user interface 600 for presenting pack off indicators according to one example of the present disclosure. The wellbore depth can include measured wellbore depth or true vertical depth for a wellbore 102. The graphical user interface 600 can present an output from the computing device 112. The output can include the pack off indicators, such as cuttings volume percent 602, pack off volume percent 604, caving volume estimations 606, or the like.

The graphical user interface 600 can include a first scale 608 and a second scale 610 for each column of one or more columns 612. The first scale 608 can provide a first numerical scale associated with the output for the graphical user interface 600. The first scale 608 can present a first range from zero percent to one hundred percent. Alternatively, the first scale 608 can present a second range with a first minimum value at a first side and a first maximum value at a second side. The minimum value and the maximum value can be determined according to the wellbore data that is plotted using the first scale. The second scale 610 can present a third range that corresponds to wellbore depth with respect to a well surface 114. The third range can start at a second minimum value and end at a second maximum value. The second minimum value can correspond to a starting wellbore depth with respect to the well surface 114. The second maximum value can correspond to an ending wellbore depth with respect to the well surface 114.

The graphical user interface 600 can include the one or more columns 612 with labeling for the one or more columns 612 at a top area of the one or more columns 612. The one or more columns 612 can include a plot of the pack off indicators. The plot can include a scatter plot, a line plot, or other suitable plot for presenting wellbore data. In examples in which the plot is a scatter plot, the scatter plot can include discrete points that are connected by lines. In some examples, an arrangement of the graphical user interface 600 can include positioning a plot of the pack off volume percent 604 horizontally offset with respect to a plot of caving volume estimations 606 and the wellbore depth. A user can use the arrangement to compare the pack off volume percent 604 to the caving volume estimations 606 at a specific wellbore depth. Additionally or alternatively, the user can use the arrangement to determine trends with respect to the wellbore depth for the pack off volume percent 604, the caving volume estimations 606, or the like. For example, the pack off volume percent 604 may increase with respect to the wellbore depth increasing due to increasing volume of downhole debris from forming the wellbore 102.

Additionally, the graphical user interface 600 can include one or more color indicators 614 for plotting the pack off volume percent. The one or more color indicators 614 can distinguish the pack off volume percent 604 for different data points in the graphical user interface 600 to enable a relatively quick comparison of the pack off volume percent

604 for the different data points. For example, a first subset of the discrete points in the plot can have a first color indicator 614a, such as green, and a second subset of the discrete points can have a second color indicator 614b, such as yellow. The first color indicator 614a can indicate that the pack off volume percent 604 is below a first predetermined threshold 618a of one or more predetermined thresholds 618, such as seventy-five percent. The second color indicator 614b can indicate that the pack off volume percent 604 is above the first predetermined threshold 618a. The pack off volume percent 604 being above the first predetermined threshold 618a can indicate a high likelihood of pack off occurring during a wellbore operation. Additionally, the second color indicator 614b can indicate to the user that action should be taken to prevent the pack off. The action can include increasing a circulation flow rate to clean the wellbore 102. Additionally or alternatively, the computing device 112 can generate an audible alarm via the input/output device 206 when the pack off volume percent 604 surpasses at least one of the one or more predetermined thresholds.

Additionally or alternatively, the graphical user interface 600 can include one or more colored regions 616 in at least one of the one or more columns 612. The one or more colored regions 616 can be positioned proximate to the labeling for the one or more columns 612. Additionally, the one or more colored regions 616 can be positioned adjacent to each other and can extend along a first length that corresponds to a second length for the second scale 610. The one or more colored regions 616 can demarcate one or more regions in the one or more columns 612.

Positioning the one or more colored regions 616 adjacent to each other can enable the user to relatively quickly compare the pack off volume percent 604 in a first colored region 616a to a second colored region 616b. For example, the first colored region 616a from the one or more colored regions 616 can correspond to the first color indicator 614a. Similarly, the second colored region 616b from the one or more colored regions 616 can correspond to the second color indicator 614b. Based on a visual difference between the first colored region 616a and the second colored regions 616b, the first colored region 616a may be determined to have a lower likelihood of pack off occurring compared to the second colored region 616b. Additionally, the one or more colored regions 616 can indicate placement of the one or more predetermined thresholds 618 along the first scale 608. For example, a colored region 616 can start at the first predetermined threshold 618a and can end at a second predetermined threshold 618b. The one or more colored regions 616 can be independent of the wellbore depth.

Figure 7:
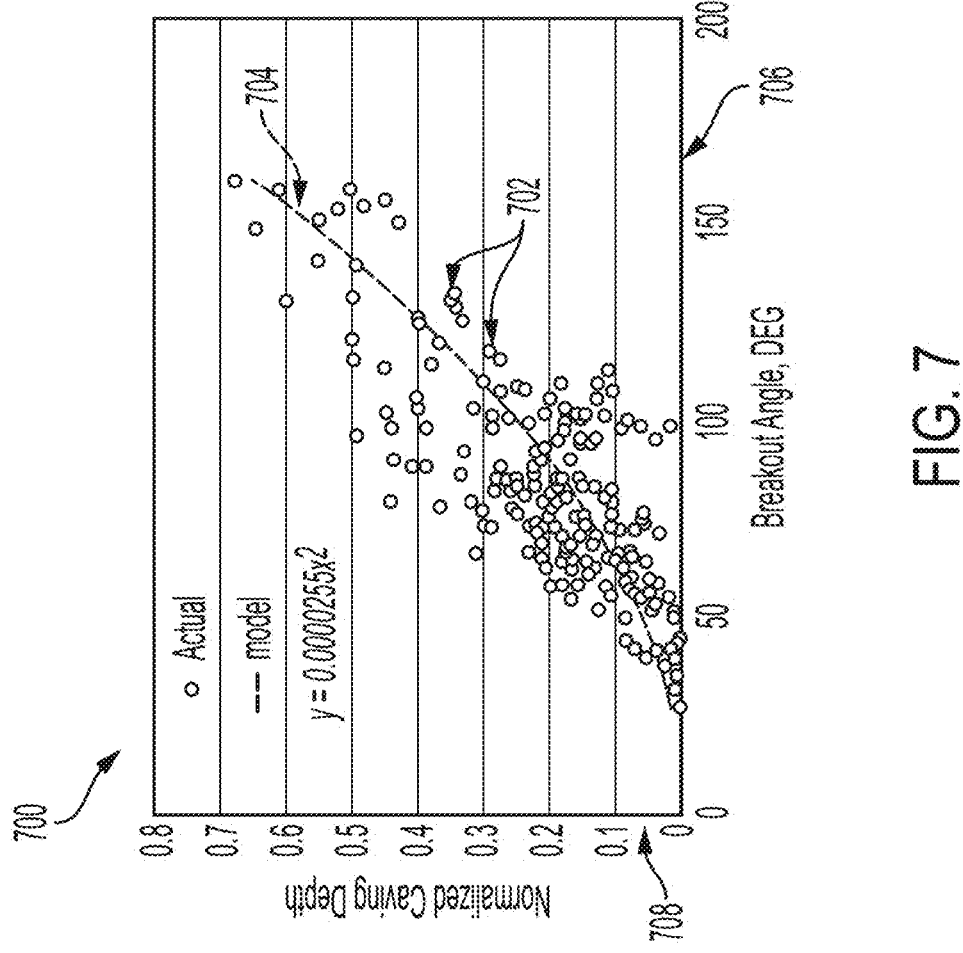
FIG. 7 is an example of a plot correlating normalized caving depth versus breakout angle according to one example of the present disclosure.

FIG. 7 is an example of a plot 700 correlating normalized caving depth versus breakout angle according to one example of the present disclosure. The plot 700 can be used to determine the normalized caving depth using the breakout angle. The plot 700 can include actual data 702 for the normalized caving depth and model data 704 for the normalized caving depth. Additionally, the plot 700 can include a first axis 706 and a second axis 708 to label contents, such as the actual data 702 and the model data 704, in the plot 700. The first axis 706 can be a horizontal axis and can present the breakout angle in units of degrees. The second axis 708 can be a vertical axis and can present the normalized caving depth, which is dimensionless.

In some aspects, a system, a method, and a non-transitory computer-readable medium for determining a pack off volume percent with respect to a wellbore operation are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a processing device; and a non-transitory computer-readable memory device that includes instructions executable by the processing device for causing the processing device to perform operations comprising: determining, based on an accumulation of geological material in a wellbore, a pack off indicator indicating a likelihood of a downhole tool being immobile in the wellbore, wherein the accumulation of geological material in the wellbore comprises cuttings resulting from an action of the downhole tool positioned in the wellbore and settled cavings resulting from instability in the wellbore, and wherein determining the pack off indicator comprises estimating the accumulation of geological material in the wellbore, the estimated accumulation comprising a respective estimated accumulation with respect to the cuttings and the settled cavings, wherein the estimated accumulation with respect to the settled cavings is outputted by a data-driven model trained using log data obtained from one or more logging tools; and dividing the estimated accumulation by a volume of a wellbore annulus defined by a first set of wellbore piping and a second set of wellbore piping positioned in the wellbore; and automatically adjusting a wellbore operation using the pack off indicator by controlling a flow of circulating fluid in response to the pack off indicator exceeding a predetermined threshold.

Example 2 is the system of example(s) 1, wherein estimating the accumulation of the geological material in the wellbore further comprises: receiving, from the one or more logging tools, the log data, wherein the log data comprises at least one of caliper log data, gamma ray log data, or sonic log data; determining, by the data-driven model and using at least the log data, a depth estimation of the settled cavings; and determining, based at least on the depth estimation, a size ratio between a first size distribution of the cuttings and a second distribution of the settled cavings.

Example 3 is the system of example(s) 1-2, wherein estimating the accumulation of the geological material in the wellbore further comprises: providing one or more geomechanical parameters to a software simulation, wherein the one or more geomechanical parameters comprise the log data, downhole pressure data, or geological stress data; and determining, by the software simulation and using the one or more geomechanical parameters, a volume estimation of the settled cavings.

Example 4 is the system of example(s) 1-3, wherein automatically adjusting the wellbore operation using the pack off indicator by controlling the flow of the circulating fluid in response to the pack off indicator exceeding the predetermined threshold further comprises: adjusting the flow of the circulating fluid to increase a removal rate of the accumulation of geological material in the wellbore.

Example 5 is the system of example(s) 1-4, wherein the operations further comprise: substantially contemporaneously receiving buffered wellbore data and wellbore pressure data, the buffered wellbore data comprising field data and data from a content database; determining, by a simulation, the pack off indicator using the buffered wellbore data, the wellbore pressure data, and a plurality of cuttings measurements; and outputting, via a user interface, the pack off indicator and the plurality of cuttings measurements for use in adjusting the wellbore operation.

Example 6 is the system of example(s) 1-5, wherein the operations further comprise outputting the pack off indicator via a user interface comprising: a plurality of columns; labeling for the plurality of columns positioned at a top area of the plurality of columns; and a first scale and a second scale for each column of the plurality of columns, wherein the first scale is a first numerical scale associated with output for each column and the second scale is a second numerical scale associated with a depth of the wellbore.

Example 7 is the system of example(s) 1-6, wherein the user interface further comprises a plurality of color indicators for an output of the pack off indicator to indicate the likelihood of the downhole tool being immobile in the wellbore, and wherein the output of the pack off indicator includes a plurality of colored regions with color corresponding to the likelihood of the downhole tool being immobile in the wellbore.

Example 8 is the system of example(s) 1-7, wherein a plurality of colored regions with color corresponding to the likelihood of the downhole tool being immobile in the wellbore are positioned adjacent to each other and proximate to the first scale, and wherein the plurality of colored regions extends along a first length that corresponds to a second length of the second scale.

Example 9 is a method comprising: determining, based on an accumulation of geological material in a wellbore, a pack off indicator indicating a likelihood of a downhole tool being immobile in the wellbore, wherein the accumulation of geological material in the wellbore comprises cuttings resulting from an action of the downhole tool positioned in the wellbore and settled cavings resulting from instability in the wellbore, and wherein determining the pack off indicator comprises: estimating the accumulation of geological material in the wellbore, the estimated accumulation comprising a respective estimated accumulation with respect to the cuttings and the settled cavings, wherein the estimated accumulation with respect to the settled cavings is outputted by a data-driven model trained using log data obtained from one or more logging tools; and dividing the estimated accumulation by a volume of a wellbore annulus defined by a first set of wellbore piping and a second set of wellbore piping positioned in the wellbore; and automatically adjusting a wellbore operation using the pack off indicator by controlling a flow of circulating fluid in response to the pack off indicator exceeding a predetermined threshold.

Example 10 is the method of example(s) 9, wherein estimating the accumulation of the geological material in the wellbore further comprises: receiving, from the one or more logging tools, the log data, wherein the log data comprises at least one of caliper log data, gamma ray log data, or sonic log data; determining, by the data-driven model and using at least the log data, a depth estimation of the settled cavings; and determining, based at least on the depth estimation, a size ratio between a first size distribution of the cuttings and a second distribution of the settled cavings.

Example 11 is the method of example(s) 9-10, wherein estimating the accumulation of the geological material in the wellbore further comprises: providing one or more geomechanical parameters to a software simulation, wherein the one or more geomechanical parameters comprise the log data, downhole pressure data, or geological stress data; and determining, by the software simulation and using the one or more geomechanical parameters, a volume estimation of the settled cavings.

Example 12 is the method of example(s) 9-11, wherein automatically adjusting the wellbore operation using the pack off indicator by controlling the flow of the circulating fluid in response to the pack off indicator exceeding the predetermined threshold further comprises: adjusting the flow of the circulating fluid to increase a removal rate of the accumulation of geological material in the wellbore.

Example 13 is the method of example(s) 9-12, wherein the method further comprises: substantially contemporaneously receiving buffered wellbore data and wellbore pressure data, the buffered wellbore data comprising field data and data from a content database; determining, by a simulation, the pack off indicator using the buffered wellbore data, the wellbore pressure data, and a plurality of cuttings measurements; and outputting, via a user interface, the pack off indicator and the plurality of cuttings measurements for use in adjusting the wellbore operation.

Example 14 is the method of example(s) 9-13, wherein the method further comprises outputting the pack off indicator via a user interface comprising: a plurality of columns; labeling for the plurality of columns at a top area of the plurality of columns; and a first scale and a second scale for each column of the plurality of columns, wherein the first scale is a first numerical scale associated with output for each column and the second scale is a second numerical scale associated with a depth of the wellbore.

Example 15 is the method of example(s) 9-14, wherein the user interface further comprises a plurality of color indicators for an output of the pack off indicator to indicate the likelihood of the downhole tool being immobile in the wellbore, and wherein the output of the pack off indicator includes a plurality of colored regions with color corresponding to the likelihood of the downhole tool being immobile in the wellbore.

Example 16 is a non-transitory computer-readable medium comprising instructions that are executable by a processing device for causing the processing device to perform operations comprising: determining, based on an accumulation of geological material in a wellbore, a pack off indicator indicating a likelihood of a downhole tool being immobile in the wellbore, wherein the accumulation of geological material in the wellbore comprises cuttings resulting from an action of the downhole tool positioned in the wellbore and settled cavings resulting from instability in the wellbore, and wherein determining the pack off indicator comprises: estimating the accumulation of geological material in the wellbore, the estimated accumulation comprising a respective estimated accumulation with respect to the cuttings and the settled cavings, wherein the estimated accumulation with respect to the settled cavings is outputted by a data-driven model trained using log data obtained from one or more logging tools; and dividing the estimated accumulation by a volume of a wellbore annulus defined by a first set of wellbore piping and a second set of wellbore piping positioned in the wellbore; and automatically adjusting a wellbore operation using the pack off indicator by controlling a flow of circulating fluid in response to the pack off indicator exceeding a predetermined threshold.

Example 17 is the non-transitory computer-readable medium of example(s) 16, wherein estimating the accumulation of the geological material in the wellbore further comprises: receiving, from the one or more logging tools, the log data, wherein the log data comprises at least one of caliper log data, gamma ray log data, or sonic log data; determining, by the data-driven model and using at least the log data, a depth estimation of the settled cavings; and determining, based at least on the depth estimation, a size ratio between a first size distribution of the cuttings and a second distribution of the settled cavings.

Example 18 is the non-transitory computer-readable medium of example(s) 16-17, wherein estimating the accumulation of the geological material in the wellbore further comprises: providing one or more geomechanical parameters to a software simulation, wherein the one or more geomechanical parameters comprise the log data, downhole pressure data, or geological stress data; and determining, by the software simulation and using the one or more geomechanical parameters, a volume estimation of the settled cavings.

Example 19 is the non-transitory computer-readable medium of example(s) 16-18, wherein automatically adjusting the wellbore operation using the pack off indicator by controlling the flow of the circulating fluid in response to the pack off indicator exceeding the predetermined threshold further comprises: adjusting the flow of the circulating fluid to increase a removal rate of the accumulation of geological material in the wellbore.

Example 20 is the non-transitory computer-readable medium of example(s) 16-19, wherein the operations further comprise: substantially contemporaneously receiving buffered wellbore data and wellbore pressure data, the buffered wellbore data comprising field data and data from a content database; determining, by a simulation, the pack off indicator using the buffered wellbore data, the wellbore pressure data, and a plurality of cuttings measurements; and outputting, via a user interface, the pack off indicator and the plurality of cuttings measurements for use in adjusting the wellbore operation.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a non-transitory computer-readable memory device that includes instructions executable by the processing device for causing the processing device to perform operations comprising:
determining, based on an accumulation of geological material in a wellbore, a pack off indicator indicating a likelihood of a downhole tool being immobile in the wellbore, wherein the accumulation of geological material in the wellbore comprises cuttings resulting from an action of the downhole tool positioned in the wellbore and settled cavings resulting from instability in the wellbore, and wherein determining the pack off indicator comprises:
estimating the accumulation of geological material in the wellbore, the estimated accumulation comprising a respective estimated accumulation with respect to the cuttings and the settled cavings, wherein the estimated accumulation with respect to the settled cavings is outputted by a data-driven model trained using log data obtained from one or more logging tools; and
dividing the estimated accumulation by a volume of a wellbore annulus defined by a first set of wellbore piping and a second set of wellbore piping positioned in the wellbore; and
automatically adjusting a wellbore operation using the pack off indicator by controlling a flow of circulating fluid in response to the pack off indicator exceeding a predetermined threshold.

2. The system of claim 1, wherein estimating the accumulation of the geological material in the wellbore further comprises:

receiving, from the one or more logging tools, the log data, wherein the log data comprises at least one of caliper log data, gamma ray log data, or sonic log data;

determining, by the data-driven model and using at least the log data, a depth estimation of the settled cavings; and determining, based at least on the depth estimation, a size ratio between a first size distribution of the cuttings and a second distribution of the settled cavings.

3. The system of claim 1, wherein estimating the accumulation of the geological material in the wellbore further comprises:

providing one or more geomechanical parameters to a software simulation, wherein the one or more geomechanical parameters comprise the log data, downhole pressure data, or geological stress data; and determining, by the software simulation and using the one or more geomechanical parameters, a volume estimation of the settled cavings.

4. The system of claim 1, wherein automatically adjusting the wellbore operation using the pack off indicator by controlling the flow of the circulating fluid in response to the pack off indicator exceeding the predetermined threshold further comprises:

adjusting the flow of the circulating fluid to increase a removal rate of the accumulation of geological material in the wellbore.

5. The system of claim 1, wherein the operations further comprise:

substantially contemporaneously receiving buffered wellbore data and wellbore pressure data, the buffered wellbore data comprising field data and data from a content database;

determining, by a simulation, the pack off indicator using the buffered wellbore data, the wellbore pressure data, and a plurality of cuttings measurements; and outputting, via a user interface, the pack off indicator and the plurality of cuttings measurements for use in adjusting the wellbore operation.

6. The system of claim 1, wherein the operations further comprise outputting the pack off indicator via a user interface comprising:

a plurality of columns;

labeling for the plurality of columns positioned at a top area of the plurality of columns; and a first scale and a second scale for each column of the plurality of columns, wherein the first scale is a first numerical scale associated with output for each column and the second scale is a second numerical scale associated with a depth of the wellbore.

7. The system of claim 6, wherein the user interface further comprises a plurality of color indicators for an output of the pack off indicator to indicate the likelihood of the downhole tool being immobile in the wellbore, and wherein the output of the pack off indicator includes a plurality of colored regions with color corresponding to the likelihood of the downhole tool being immobile in the wellbore.

8. The system of claim 6, wherein a plurality of colored regions with color corresponding to the likelihood of the downhole tool being immobile in the wellbore are positioned adjacent to each other and proximate to the first scale, and wherein the plurality of colored regions extends along a first length that corresponds to a second length of the second scale.

9. A method comprising:

determining, based on an accumulation of geological material in a wellbore, a pack off indicator indicating a likelihood of a downhole tool being immobile in the wellbore, wherein the accumulation of geological material in the wellbore comprises cuttings resulting from an action of the downhole tool positioned in the wellbore and settled cavings resulting from instability in the wellbore, and wherein determining the pack off indicator comprises:

estimating the accumulation of geological material in the wellbore, the estimated accumulation comprising a respective estimated accumulation with respect to the cuttings and the settled cavings, wherein the estimated accumulation with respect to the settled cavings is outputted by a data-driven model trained using log data obtained from one or more logging tools; and dividing the estimated accumulation by a volume of a wellbore annulus defined by a first set of wellbore piping and a second set of wellbore piping positioned in the wellbore; and automatically adjusting a wellbore operation using the pack off indicator by controlling a flow of circulating fluid in response to the pack off indicator exceeding a predetermined threshold.

10. The method of claim 9, wherein estimating the accumulation of the geological material in the wellbore further comprises:

receiving, from the one or more logging tools, the log data, wherein the log data comprises at least one of caliper log data, gamma ray log data, or sonic log data;

determining, by the data-driven model and using at least the log data, a depth estimation of the settled cavings; and determining, based at least on the depth estimation, a size ratio between a first size distribution of the cuttings and a second distribution of the settled cavings.

11. The method of claim 9, wherein estimating the accumulation of the geological material in the wellbore further comprises:

providing one or more geomechanical parameters to a software simulation, wherein the one or more geomechanical parameters comprise the log data, downhole pressure data, or geological stress data; and determining, by the software simulation and using the one or more geomechanical parameters, a volume estimation of the settled cavings.

12. The method of claim 9, wherein automatically adjusting the wellbore operation using the pack off indicator by controlling the flow of the circulating fluid in response to the pack off indicator exceeding the predetermined threshold further comprises:

adjusting the flow of the circulating fluid to increase a removal rate of the accumulation of geological material in the wellbore.

13. The method of claim 9, further comprising:

substantially contemporaneously receiving buffered wellbore data and wellbore pressure data, the buffered wellbore data comprising field data and data from a content database;

determining, by a simulation, the pack off indicator using the buffered wellbore data, the wellbore pressure data, and a plurality of cuttings measurements; and outputting, via a user interface, the pack off indicator and the plurality of cuttings measurements for use in adjusting the wellbore operation.

14. The method of claim 9, further comprising outputting the pack off indicator via a user interface comprising:

a plurality of columns;

labeling for the plurality of columns positioned at a top area of the plurality of columns; and a first scale and a second scale for each column of the plurality of columns, wherein the first scale is a first numerical scale associated with output for each column and the second scale is a second numerical scale associated with a depth of the wellbore.

15. The method of claim 14, wherein the user interface further comprises a plurality of color indicators for an output of the pack off indicator to indicate the likelihood of the downhole tool being immobile in the wellbore, and wherein the output of the pack off indicator includes a plurality of colored regions with color corresponding to the likelihood of the downhole tool being immobile in the wellbore.

16. A non-transitory computer-readable medium comprising instructions that are executable by a processing device for causing the processing device to perform operations comprising:

determining, based on an accumulation of geological material in a wellbore, a pack off indicator indicating a likelihood of a downhole tool being immobile in the wellbore, wherein the accumulation of geological material in the wellbore comprises cuttings resulting from an action of the downhole tool positioned in the wellbore and settled cavings resulting from instability in the wellbore, and wherein determining the pack off indicator comprises:

estimating the accumulation of geological material in the wellbore, the estimated accumulation comprising a respective estimated accumulation with respect to the cuttings and the settled cavings, wherein the estimated accumulation with respect to the settled cavings is outputted by a data-driven model trained using log data obtained from one or more logging tools; and dividing the estimated accumulation by a volume of a wellbore annulus defined by a first set of wellbore piping and a second set of wellbore piping positioned in the wellbore; and automatically adjusting a wellbore operation using the pack off indicator by controlling a flow of circulating fluid in response to the pack off indicator exceeding a predetermined threshold.

17. The non-transitory computer-readable medium of claim 16, wherein estimating the accumulation of the geological material in the wellbore further comprises:

receiving, from the one or more logging tools, the log data, wherein the log data comprises at least one of caliper log data, gamma ray log data, or sonic log data;

determining, by the data-driven model and using at least the log data, a depth estimation of the settled cavings; and determining, based at least on the depth estimation, a size ratio between a first size distribution of the cuttings and a second distribution of the settled cavings.

18. The non-transitory computer-readable medium of claim 16, wherein estimating the accumulation of the geological material in the wellbore further comprises:

providing one or more geomechanical parameters to a software simulation, wherein the one or more geomechanical parameters comprise the log data, downhole pressure data, or geological stress data; and determining, by the software simulation and using the one or more geomechanical parameters, a volume estimation of the settled cavings.

19. The non-transitory computer-readable medium of claim 16, wherein automatically adjusting the wellbore operation using the pack off indicator by controlling the flow of the circulating fluid in response to the pack off indicator exceeding the predetermined threshold further comprises:

adjusting the flow of the circulating fluid to increase a removal rate of the accumulation of geological material in the wellbore.

20. The non-transitory computer-readable medium of claim 16, wherein the operations further comprise:

substantially contemporaneously receiving buffered wellbore data and wellbore pressure data, the buffered wellbore data comprising field data and data from a content database;

determining, by a simulation, the pack off indicator using the buffered wellbore data, the wellbore pressure data, and a plurality of cuttings measurements; and outputting, via a user interface, the pack off indicator and the plurality of cuttings measurements for use in adjusting the wellbore operation.

* * * * *